Patented Feb. 5, 1935

1,990,273

UNITED STATES PATENT OFFICE 1,990,273

SOLDERING FLUX

Harry B. Dykstra, Wilmington, Del., assignor, by mesne assignments, to The Grasselli Chemical Company, Cleveland, Ohio, a corporation of Delaware No Drawing. Application November 16, 1933, Serial No. 698,364

10 Claims. (Cl. 148—23)

Zinc chloride fluxes have been extensively used in the soft soldering of metals and while quite satisfactory soldering can be done with them they are corrosive. When a zinc chloride flux is used on tin can seams, for example, it is necessary to carefully remove the residue, otherwise serious damage may result due to corrosion.

This invention is directed to a process and a flux whereby the residue after soldering is non-corrosive and may, if desired, be left on the work without danger of damage.

I have found satisfactory, compounds of the formula:

(1)

in which one R is an aliphatic radical of 5 or more carbon atoms and containing more than one hydroxyl group, and in which the remaining R's are of the same type, hydrogen, or monovalent hydrocarbon radicals.

Where one or more R's are aliphatic radicals of five or more carbon atoms and containing more than one hydroxyl group and the remaining R's, if any, are hydrogen the formula represents compounds such as the xylamines, glucamines, and their homologues. Glucamine, for example, has the formula:

(2)
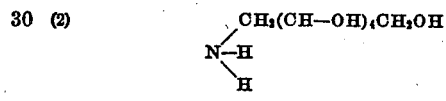

Di-glucamine and tri-glucamine are, respectively, the secondary and tertiary amines.

Each of these amines is an efficient flux for soft soldering tin plate. It is unnecessary to use the pure individual compounds as commercial mixtures of two or three of them operate quite satisfactorily.

When one R of Formula (1) is an aliphatic radical of five or more carbon atoms and containing more than one hydroxyl group, as illustrated in Formula (2), a primary amine results. One or both of the remaining R's (hydrogens) may be replaced by monovalent hydrocarbon radicals. Compounds of this type, for example, are methyl glucamine, methyl ethyl glucamine, di-methyl glucamine, cyclohexyl glucamine and phenyl glucamine.

Secondary amines, in the same way, may have the remaining R (hydrogen) replaced by a monovalent hydrocarbon radical to give compounds such as methyl di-glucamine, ethyl di-glucamine, etc.

Again, while individual compounds operate quite satisfactorily it may be commercially more feasible to use mixtures containing several of them. It is the presence of the amino group in conjunction with the presence of more than one hydroxyl group and five or more carbon atoms in one aliphatic radical that determines the usefulness of compounds for my purpose.

I may also use my soldering fluxes in conjunction with other soldering fluxes. For instance, one, or a mixture of the compounds of my invention may be mixed with rosin to form a very satisfactory soldering flux.

For purposes of illustration it is noted that glucamine, either anhydrous or in aqueous solution, constitutes a very desirable non-corrosive flux for soft soldering tin plate. Using glucamine in aqueous solution I find that the best results are obtained when the solution contains about 10% of glucamine.

The fluxes of my invention are used in the usual manner. For example, the plate to be soldered may be dipped in a solution of the flux prior to soldering, or the solution may be applied with a brush or rag. Or, if preferred, my fluxes may be used in the anhydrous condition or in the form of a suitable paste. The soldering operation then proceeds in the usual manner. The residue may be removed or it may be left on the work without danger of damage due to corrosion.

I claim:

1. A soldering flux comprising a compound of the formula:

in which one R represents an aliphatic radical of five or more carbon atoms and containing more than one hydroxyl group, and in which the remaining R's are of the same type, hydrogen, or a monovalent hydrocarbon radical.

2. A soldering flux comprising glucamine.

3. A soldering flux for tin comprising an aqueous solution containing about 10% of glucamine.

4. In a process of uniting metals by soldering the step of applying a soldering flux comprising a compound of the formula:

in which at least one R represents an aliphatic radical of five or more carbon atoms and containing more than one hydroxyl group and in which the remaining R's are of the same type, hydrogen, or a monovalent hydrocarbon radical.

5. In a process of soldering the step of applying a soldering flux comprising glucamine.

6. In a process of soft soldering tin plate the step of applying a soldering flux comprising an aqueous solution containing about 10% of glucamine.

7. A soldering flux for tin comprising a compound of the formula:

in which one R represents an aliphatic radical of five or more carbon atoms and containing more than one hydroxyl group, and in which the remaining R's are of the same type, hydrogen, or a monovalent hydrocarbon radical.

8. A soldering flux for tin comprising glucamine.

9. In a process of soft soldering tin the step comprising employing as a flux a material comprising a compound of the formula:

in which R represents an aliphatic radical of five or more carbon atoms and containing more than one hydroxyl group, and in which the remaining R's are of the same type, hydrogen, or a monovalent hydrocarbon radical.

10. In a process of soft soldering tin the step comprising employing as a flux a composition comprising glucamine.

HARRY B. DYKSTRA.